United States Patent
Akao et al.

(10) Patent No.: US 8,350,998 B2
(45) Date of Patent: Jan. 8, 2013

(54) RETARDATION SUBSTRATE, METHOD OF MANUFACTURING THE SAME, AND LIQUID CRYSTAL DISPLAY

(75) Inventors: Sosuke Akao, Tokyo (JP); Yuji Kubo, Tokyo (JP); Noritaka Mihashi, Tokyo (JP); Godai Fukunaga, Tokyo (JP); Masashi Aimatsu, Tokyo (JP); Takeshi Itoi, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 152 days.

(21) Appl. No.: 12/929,761

(22) Filed: Feb. 14, 2011

(65) Prior Publication Data

US 2011/0141407 A1 Jun. 16, 2011

Related U.S. Application Data

(63) Continuation of application No. PCT/JP2009/063365, filed on Jul. 27, 2009.

(30) Foreign Application Priority Data

Aug. 15, 2008 (JP) ................. 2008-209250

(51) Int. Cl.
*G02F 1/1335* (2006.01)

(52) U.S. Cl. ................. 349/117; 349/96; 349/98

(58) Field of Classification Search .............. 349/96–98, 349/117
See application file for complete search history.

(56) References Cited

U.S. PATENT DOCUMENTS

2005/0142464 A1 6/2005 Moriya

FOREIGN PATENT DOCUMENTS

| JP | 2005-24919 | 1/2005 |
| JP | 2005-345982 | 12/2005 |
| JP | 2006-85130 | 3/2006 |
| JP | 2007-171815 | 7/2007 |
| JP | 2007-233141 | 9/2007 |
| JP | 2007-241071 | 9/2007 |

OTHER PUBLICATIONS

Chinese Office Action mailed Mar. 19, 2012 issued in corresponding Chinese Patent Application No. 200980131805.7.
International Search Report for PCT/JP2009/063365 mailed Sep. 29, 2009.

*Primary Examiner* — Phu Vu

(57) ABSTRACT

A retardation layer that includes regions causing different retardations can be manufactured easily. A retardation substrate includes a substrate and a solidified liquid crystal layer facing its main surface. The solidified liquid crystal layer includes first to third regions, and a degree of depolarization for each of the regions is less than $5.0 \times 10^{-4}$. A difference between the maximum and minimum values of the degrees of depolarization obtained for the regions is less than $2.0 \times 10^{-4}$.

21 Claims, 4 Drawing Sheets

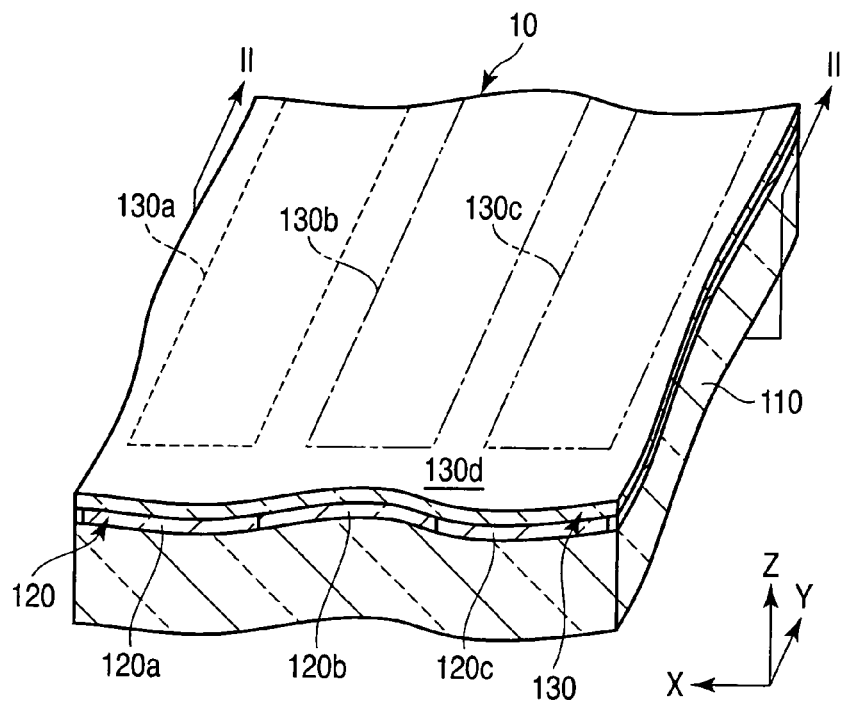
F I G. 1
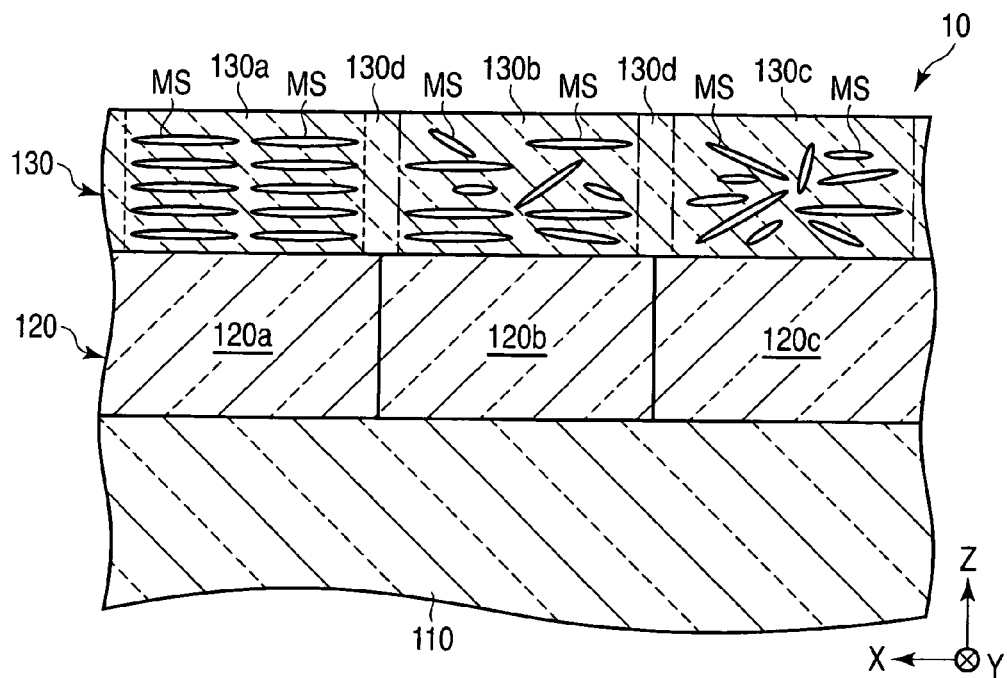
F I G. 2

RETARDATION SUBSTRATE, METHOD OF MANUFACTURING THE SAME, AND LIQUID CRYSTAL DISPLAY

CROSS REFERENCE TO RELATED APPLICATIONS

This is a Continuation Application of PCT Application No. PCT/JP2009/063365, filed Jul. 27, 2009, which was published under PCT Article 21(2) in Japanese.

This application is based upon and claims the benefit of priority from prior Japanese Patent Application No. 2008-209250, filed Aug. 15, 2008, the entire contents of which are incorporated herein by reference.

BACKGROUND OF THE INVENTION

1. Field of the Invention

The present invention relates to an optical technique that can be applied, for example, to a display such as liquid crystal display.

2. Description of the Related Art

Liquid crystal displays have characteristics of thin-shaped, lightweight and low power consumption. Thus, in recent years, their application to mobile devices and stationary equipments such as television receivers increases rapidly.

In order to make it possible for a liquid crystal display to display a multi-colored image, a color filter is utilized. For example, in a transmissive or reflective liquid crystal display that can display a multi-colored image, a color filter including red, green and blue coloring layers is utilized in most cases. On the other hand, in a semi-transparent liquid crystal display that can display a multi-colored image, a color filter including red, green and blue coloring layers for transmissive display and red, green and blue coloring layers for reflective display is utilized in most cases.

Many liquid crystal displays include a retardation film. For example, in a liquid crystal display of a television receiver, a retardation film is utilized in combination with a linearly polarizing film in order, to display an image that can be easily recognized regardless of the viewing direction. On the other hand, in a reflective or semi-transparent liquid crystal display, an absorption-type circularly polarizing plate including a quarter-wave plate or a combination of a quarter-wave plate and a half-wave plate as a retardation film is utilized in order to achieve an excellent visibility under a high-luminance light source such as sun.

However, in spite of the fact that the red, green and blue pixels are different in wavelength range of display color from one another, the optical properties of a retardation film are usually even throughout its surface. For this reason, it is difficult to adopt optimal designs into all the pixels different in display color.

To be more specific, each of the retardation of a liquid crystal layer and the retardation of a retardation film has wavelength dispersion. For this reason, when employing a design for sufficiently compensating the retardation of a liquid crystal cell using a retardation film at pixels that display a certain color, the retardation film may insufficiently compensate the retardation of a liquid crystal cell at pixels that display other colors.

Similarly, in the case where a quarter-wave plate which causes a retardation by a quarter of a wavelength ($\lambda/4$) at about 550 nm is combined with a linearly polarizing plate to be used as a circularly polarizing plate, even when the refractive index anisotropy, i.e., birefringence $\Delta n$ of the quarter-wave plate is almost uniform throughout the wavelength range of visible rays, a retardation greater than $\lambda/4$ will be caused within a blue wavelength range, for example, at about 450 nm. Also, a retardation smaller than $\lambda/4$ will be caused within a red wavelength range, for example, at about 630 nm. Thus, when the circularly polarizing plate is irradiated with blue and red lights as natural lights, the transmitted light will be not a circularly polarized light but an elliptically polarized light. In fact, since the birefringence is greater on the short-wavelength's side of the visible range, i.e., within the blue wavelength range and is smaller on the long-wavelength's side of the visible range, i.e., within the red wavelength range, this problem is often more serious.

JP-A 2005-24919 and JP-A 2006-85130 describe as a retardation layer a solidified liquid crystal layer that includes regions that differ in thickness from each other, i.e., regions causing different retardations.

Specifically, JP-A 2005-24919 describes that a color filter layer composed of red, green and blue coloring layers different in thickness is formed, and a solidified liquid crystal layer is formed on the color filter layer. The solidified liquid crystal layer is obtained by coating an alignment layer with a coating solution containing photo-polymerizing liquid crystal compound and irradiating the coated film with ultraviolet rays.

According to this method, due to the relief structure that the coloring layers produces on the surface of the color filter layer, a solidified liquid crystal layer thicker at a position of the thinner coloring layer and thinner at a position of the thicker coloring layer can be obtained. That is, a solidified liquid crystal layer different in thickness among pixels that display different colors can be obtained. In other words, a solidified liquid crystal layer including regions that cause different retardations can be obtained.

JP-A 2006-85130 describes a semi-transparent liquid crystal display that includes a color filter layer and a solidified liquid crystal layer. In this liquid crystal display, each coloring layer of the color filter layer is thicker at the transmissive portions of pixels and thinner at the reflective portion of the pixels. That is, the surface of the color filter layer is provided with a relief structure. The solidified liquid crystal layer is obtained by forming a polyimide layer on the surface of the color filter layer provided with the relief structure, performing a rubbing process on the whole surface of the polyimide layer, coating the polyimide layer with ultraviolet-curing liquid crystal monomer, and irradiating the coated layer with ultraviolet rays. Alternatively, coating the surface of the color filter layer with a liquid crystal polymer and subjecting the whole coated film to a photo-alignment process obtain the solidified liquid crystal layer. The solidified liquid crystal layer thus obtained is thinner at the transmissive portions of pixels and thicker at the reflective portions of the pixels. That is, according to the method, a solidified liquid crystal layer that includes regions causing different retardations can be obtained.

However, according to the technique described in JP-A 2005-24919, it is necessary to accurately adjust the differences in thickness among the coloring layers. Similarly, according to the technique described in JP-A 2006-85130, it is necessary to accurately adjust the difference between the thickness of the coloring layer at the reflective portion and the thickness of the coloring layer at the transmissive portion. For this reason, when the above-described techniques are employed, the design for the color filter layer is limited or the degree of difficulty in manufacturing the color filter layer increases. Therefore, in order to achieve the design thickness at each region of the solidified liquid crystal layer, it is necessary to consider various factors such as flowability of a coating solution and a shrinkage ratio of the coated film.

BRIEF SUMMARY OF THE INVENTION

An object of the present invention is to make it possible to easily manufacture a retardation layer that includes regions causing different retardations.

According to a first aspect of the present invention, there is provided a retardation substrate comprising a substrate and a solidified liquid crystal layer facing its main surface, the solidified liquid crystal layer including first to third regions arranged parallel with the main surface, wherein a degree of depolarization calculated by the equation below is less than $5 \times 10^{-4}$ for each of the first to third regions and a difference between the maximum and minimum values of the degrees of depolarization obtained for the first to third regions is less than $2.0 \times 10^{-4}$ when supposing that under a first illumination condition in which a pair of polarizing plates face each other such that their transmission axes are parallel with each other and one of the polarizing plates is illuminated with a white light in a normal direction, the other polarizing plate emits a transmitted light in the normal direction at a luminance L1, under a second illumination condition which is the same as the first illumination condition except that the pair of polarizing plates face each other such that their transmission axes are orthogonal to each other, the other polarizing plate emits a transmitted light in the normal direction at a luminance L2, a contrast ratio $CR_{PL}$ is a ratio L1/L2 of the luminance L1 with respect to the luminance L2, under a third illumination condition which is the same as the first illumination condition except that the solidified liquid crystal layer is interposed between the pair of the polarizing plates, the other polarizing plate emits a transmitted light at a luminance L3 in the normal direction, under a fourth illumination condition which is the same as the third illumination condition except that the pair of polarizing plates face each other such that their transmission axes are orthogonal to each other, the other polarizing plate emits a transmitted light at a luminance L4 in the normal direction, and a contrast ratio $CR_{RE}$ is a maximum value of a ratio L3/L4 of the luminance L3 with respect to the luminance L4.

$$D = 1 - \frac{(CR_{PL} + 1)}{(CR_{PL} - 1)} \times \frac{(CR_{RE} - 1)}{(CR_{RE} + 1)}$$

According to a second aspect of the present invention, there is provided a liquid crystal display comprising the retardation substrate according to the first aspect, and a liquid crystal layer facing it.

According to a third aspect of the present invention, there is provided a method of manufacturing a retardation substrate, comprising forming a solidified liquid crystal layer above a substrate, the formation of the solidified liquid crystal layer including a film formation process in which a liquid crystal material layer is formed above the substrate, the liquid crystal material layer including a photo-polymerizing or photo-crosslinking thermotropic liquid crystal compound and mesogens of the thermotropic liquid crystal compound forming a predetermined orientation structure, an exposure process in which at least three regions of the liquid crystal material layer are exposed to light at different exposure values or at different degrees of luminous intensity or to lights of different emission lines while maintaining a deviation of temperature at each position of the substrate from an average temperature of the substrate within 3° C. and maintaining a variation in the average temperature with time within 3° C. so as to form first to third regions in the liquid crystal material layer, the first region including a polymerization or crosslinking product of the thermotropic liquid crystal compound, the second region including the polymerization or crosslinking product and the thermotropic liquid crystal compound as an unreacted compound and having a percentage of the polymerization or crosslinking product content lower than that of the first region, and the third region having a percentage of the polymerization or crosslinking product content lower than that of the second region, a developing process subsequent thereto in which the liquid crystal material layer is heated in an atmosphere containing oxygen at a concentration which corresponds to 0.1% by volume or higher at atmospheric pressure to a temperature equal to or higher than a phase transition temperature at which the thermotropic liquid crystal compound changes from a liquid crystal phase to an isotropic phase so as to lower degree of orientation of mesogens in at least the second and third regions, and a fixing process in which the unreacted compound is polymerized and/or crosslinked in an oxygen-free atmosphere or in an atmosphere containing oxygen at a concentration which corresponds to 5% by volume or lower at atmospheric pressure while the degree of orientation kept lowered.

BRIEF DESCRIPTION OF THE SEVERAL VIEWS OF THE DRAWING

FIG. 1 is a perspective view schematically showing a retardation substrate according to an embodiment of the present invention;

FIG. 2 is a sectional view taken along the line II-II of the retardation substrate shown in FIG. 1;

DETAILED DESCRIPTION OF THE INVENTION

Figure 3:
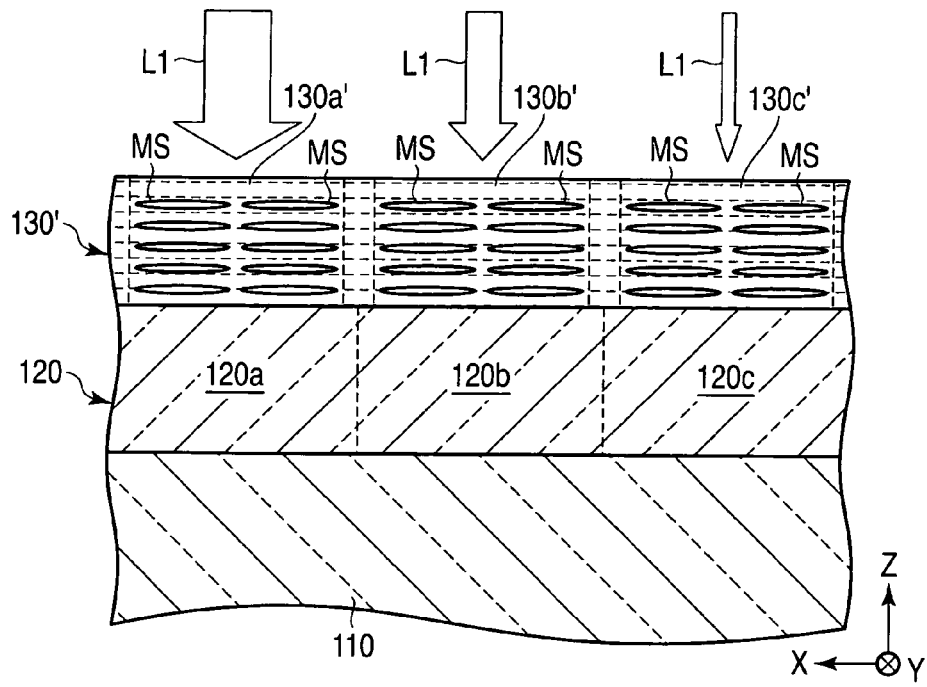
FIG. 3 is a sectional view schematically showing an example of a method of forming a solidified liquid crystal layer.

An embodiment of the present invention will be described below with reference to the accompanying drawings. Note that the same reference symbols in the drawings denote components that achieve the same or similar functions, and a repetitive explanation thereof will be omitted.

FIG. 1 is a perspective view schematically showing a retardation substrate according to an embodiment of the present invention. FIG. 2 is a sectional view taken along the line II-II of the retardation substrate shown in FIG. 1.

The retardation substrate 10 shown in FIGS. 1 and 2 includes a substrate 110, a color filter layer 120 and a solidified liquid crystal layer 130.

The substrate 110 has a light-transmitting property. The substrate 110 is, for example, a transparent substrate.

The color filter layer 120 is formed on the substrate 110. The color filter layer 120 includes coloring layers 120a to 120c different in absorption spectrum from one another and adjacent to one another on the substrate 110. For example, the light transmitted by the coloring layer 120a has a wavelength longer than a wavelength of the light transmitted by the coloring layer 120b, and the light transmitted by the coloring layer 120b has a wavelength longer than the wavelength of the light transmitted by the coloring layer 120c.

The color filter layer 120 may further include one or more coloring layer different in absorption spectrum from the coloring layer 120a to 120c. Here, as an example, it is supposed that the first coloring layer 120a is a red coloring layer, the second coloring layer 120b is a green coloring layer, and the third coloring layer 120c is a blue coloring layer.

Each of the coloring layers 120a to 120c has a band-like shape extending in the Y direction. The coloring layers 120a to 120c are arranged in the X direction crossing the Y direction to form a stripe arrangement. Note that the X direction and the Y direction are directions parallel with the surface of the substrate 110 that faces the color filter layer 120. Note also that the Z direction to be referred later is a direction perpendicular to the X direction and the Y direction.

The coloring layers 120a to 120c may have other shapes. For example, each of the coloring layers 120a to 120c has a rectangular shape. In this case, the coloring layers 120a to 120c may form a square arrangement of a delta arrangement.

Each of the coloring layers 120a to 120c is made of, for example, a mixture containing a transparent resin and a pigment dispersed therein. Forming a patterned layer of a coloring composition that contains a pigment and a pigment carrier and curing the patterned layer can obtain each of the coloring layers 120a to 120c. The coloring composition will be described later.

The solidified liquid crystal layer 130 is a retardation layer. The solidified liquid crystal layer 130 is formed on the color filter layer 120. Although the solidified liquid crystal layer 130 may be patterned, it is typically a continuous layer and covers the entire main surface of the color filter layer 120.

The solidified liquid crystal layer 130 and the color filter layer 120 may be in contact with each other or not. In the latter case, an alignment layer may be interposed between the solidified liquid crystal layer 130 and the color filter layer 120.

The solidified liquid crystal layer 130 includes three or more regions arranged in a direction parallel with the main surface thereof. At least two of the regions have form birefringence and cause different retardations.

Specifically, the solidified liquid crystal layer 130 includes regions 130a to 130d. The regions 130a to 130d are adjacent to one another in a direction perpendicular to the Z direction.

The regions 130a to 130c face the coloring layer 120a to 120c, respectively. The regions 130a to 130c have almost the same shape.

The regions 130a to 130c are smaller than the coloring layer 120a to 130b, respectively. The regions 130a to 130c are spaced apart from one another.

The region 130d is the region of the solidified liquid crystal layer 130 other than the regions 130a to 130c. The region 130d may be omitted. In this case, for example, the regions 130a to 130c is so arranged that their contours have almost the same positions as the contours of the coloring layers 120a to 120c, respectively.

The regions 130a to 130d are formed by polymerization and/or crosslinking of a thermotropic liquid crystal compound or composition. The regions 130a to 130d are equal in composition.

Typically, the regions 130a to 130d are equal in thickness. That is, typically, the solidified liquid crystal layer 130 has a uniform thickness.

The regions 130a to 130c are different in degree of orientation. The region 130a is higher in degree of orientation than the region 130b. The region 130b is higher in degree of orientation than the region 130c. Therefore, the region 130a is greater in refractive index anisotropy than the region 130b, and the region 130b is greater in refractive index anisotropy than the region 130c. Note that the region 130c may have form birefringence or be optically isotropic.

Here, the "degree of orientation" refers to the degree of orientation of the mesogens MS in each of the regions adjacent in the in-plane direction. The degree of orientation of the mesogens MS may be uniform in the entire region or varied along the Z direction. For example, the degree of orientation may be higher near the lower surface and lower near the upper surface. In this case, the "degree of orientation" refers to an average of the degree of orientation in the direction of thickness.

A higher degree of orientation in the region 130a than that in the region 130b can be confirmed by comparing the refractive index anisotropy of the region 130a with the refractive index anisotropy of the region 130b. Similarly, a higher degree of orientation in the region 130b than that in the region 130c can be confirmed by comparing the refractive index anisotropy of the region 130b with the refractive index anisotropy of the region 130c.

As above, the regions 130a to 130c are different in degree of orientation. Further, the regions 130a to 130c are almost equal in thickness. Therefore, the regions 130a to 130c cause different retardations.

In the case where the mesogens have rod-like shape, each of the regions 130a to 130c may be, for example, a positive A-plate corresponding to a homogeneous alignment in which the longitudinal directions of the mesogens are aligned in a direction almost perpendicular to the Z direction, a positive C-plate corresponding to a homeotropic alignment in which the longitudinal directions of the mesogens are aligned in a direction almost parallel with the Z direction, or a negative C-plate that corresponds to a cholesteric alignment in which a helical structure is formed to have a helical axis almost parallel with the Z direction and the longitudinal directions of the mesogens are aligned in a direction almost perpendicular to the Z direction in each plane perpendicular to the helical axis. Also, in the case where the mesogens have rod-like shape, each of the regions 130a to 130c may be a composite of the positive A-plate and the negative C-plate corresponding to a cholesteric alignment deformed such that the longitudinal directions of the mesogens biased in a direction perpendicular to the Z direction. In the case where the mesogens have disk-like shape, each of the regions 130a to 130c is, for example, a negative C-plate corresponding a homeotropic alignment in which the thickness directions of the mesogens are aligned in a direction almost parallel with the Z direction, or a negative A-plate corresponding to a homogeneous alignment in which the thickness directions of the mesogens are aligned in a direction almost perpendicular to the Z direction. As above, the regions 130a to 130c may employ any alignment structure.

As mentioned above, the region 130c may be optically isotropic. That is, in the region 130c, it is unnecessary that the mesogens form an alignment structure.

As described above, the retardation substrate 10 includes regions 130a to 130c different in refractive index anisotropy from one another. For this reason, it is unnecessary to make the thicknesses of the regions 130a to 130c different from one another in order to make the retardations caused thereby different from one another. Thus, although the thicknesses of the regions 130a to 130c may be different from one another, the thicknesses of the regions 130a to 130c can be made equal to one another. Therefore, the solidified liquid crystal layer 130 can be manufactured easily.

Further, the solidified liquid crystal layer 130 as a continuous film makes the mass transfer from the color filter layer 120 to the outside of the retardation substrate 10 more difficult than a patterned solidified liquid crystal layer 130. Therefore, in the case where the retardation substrate 10 that includes the solidified liquid crystal layer 130 as a continuous layer is used, for example, in a liquid crystal layer, it is possible to suppress the inclusion of impurities from the color filter layer 120 into the liquid crystal layer.

The solidified liquid crystal layer 130 has a degree of depolarization D, which can be obtained by the method described later, of less than $5.0 \times 10^{-4}$ for each of the regions 130a to 130c. In addition, the difference between the maximum and minimum values of the degrees of depolarization D obtained for the first to third regions is less than $2.0 \times 10^{-4}$. That is, the solidified liquid crystal layer 130 has a low degree of depolarization D for each of the regions 130a to 130c, and the degrees of depolarization D vary little among the regions 130a to 130c.

In the case where a solidified liquid crystal layer 130 with low degrees of depolarization D is used in a liquid crystal display, a higher contrast ratio, etc. can be achieved as compared with the case where a solidified liquid crystal layer 130 with low degrees of depolarization D is used in the liquid crystal display. In the case where a solidified liquid crystal layer 130 whose degrees of depolarization D vary little is used in a liquid crystal display, a black color which is less tinted, for example, can be displayed as compared with the case where a solidified liquid crystal layer 130 whose degrees of depolarization D vary widely is used in the liquid crystal display.

The degree of depolarization D is a value obtained by the following method. First, a pair of polarizing plates are arranged to face each other such that their transmission axes are parallel with each other, and then one of the polarizing plates is illuminated with a white light. Under this first illumination condition, measured is the luminance L1 of the transmitted light that the other polarizing plate emits in the normal direction. Then, under the second illumination condition that is the same as the first illumination condition except for arranging the polarizing plates to face each other such that their transmission axes cross perpendicularly, measured is the luminance L2 of the transmitted light that the above-described "the other polarizing plate" emits in the normal direction. The ratio L1/L2 of the luminance L1 to the luminance L2 is referred to as a contrast ratio $CR_{PL}$.

On the other hand, under the third illumination condition that is the same as the first illumination condition except for placing the solidified liquid crystal layer between the polarizing plates, measured is the luminance L3 of the transmitted light that the above-described "the other polarizing plate" emits in the normal direction. Then, under the fourth illumination condition that is the same as the third illumination condition except for arranging the polarizing plates to face each other such that their transmission axes cross perpendicularly, measured is the luminance L4 of the transmitted light that the above-described "the other polarizing plate" emits in the normal direction. It should be noted that in the case where the solidified liquid crystal layer 130 has in-plane refractive index anisotropy, each value of luminance L3 and L4 changes according the angles (azimuth angles) formed by the solidified liquid crystal layer 130 and the polarizing plates. Here, the maximum value of the ratio L3/L4 of the luminance L3 to the luminance L4 is referred to as a contrast ratio $CR_{RE}$. In short, the maximum value of the luminance L3 and the minimum value of the luminance L4 are obtained, and then the contrast ratio $CR_{RE}$ is calculated using these values.

By substituting the contrast ratios $CR_{PL}$ and $CR_{RE}$ thus obtained into the following equation, the degree of depolarization D is obtained.

$$D = 1 - \frac{(CR_{PL}+1)}{(CR_{PL}-1)} \times \frac{(CR_{RE}-1)}{(CR_{RE}+1)}$$

The change in optical properties for each of the regions 130a to 130c due to heating is small. For example, in the case where each of the regions 130a to 130c is subjected to heating at 230° C. in the atmosphere for 1 hour, the change in retardation due to the heating is, for example, less than 5 nm or less than 3%. Thus, even when a heat treatment is carried out after forming the solidified liquid crystal layer 130, there is no possibility that the performance of the retardation substrate 10 or an optical device including this such as a liquid crystal display substantially deviates from the design values due to the change in optical properties of the solidified liquid crystal layer 130.

Further, each of the regions 130a to 130c is poor in light-scattering ability. The haze for each of the regions 130a to 130c is, for example, less than 2%.

Next, materials and manufacturing methods of the retardation substrate 10 will be described.

The substrate 10 is, typically, a light-transmitting substrate such as glass plate or resin plate. As a material of the glass plate, for example, soda-lime glass, low-alkali borosilicate glass or non-alkali amino borosilicate glass can be used. As a material of the resin plate, for example, polycarbonate, polymethyl methacrylate or polyethylene terephthalate may be used.

The substrate 10 may have a monolayer structure or a multi-layered structure. For example, in the case where the retardation substrate 10 is a component of a liquid crystal display, a light-transmitting substrate on which a transparent electrode made of transparent conductor such as indium tin oxide or tin oxide may be used as the substrate 10. Alternatively, as the substrate 110, a light-transmitting substrate on which a circuit such as pixel circuit is formed may be used.

The substrate 110 may be a light-transmitting film such as plastic film or a light-transmitting sheet such as plastic sheet.

It is unnecessary that the substrate 110 has a light-transmitting property. For example, when the retardation substrate employs the structure in which reflected light is utilized instead of transmitted light, the substrate 110 may have light-shielding property.

For forming the color filter layer 120, any method may be employed. According to an example, each of the coloring layers 120a to 120c can be obtained by forming a film of a coloring composition that contains a pigment carrier and a pigment dispersed therein and curing the film.

As the pigment of the coloring composition, organic pigment and/or inorganic pigment can be used. The coloring composition may contain a single organic or inorganic pigment, or a plurality of organic pigments and/or inorganic pigments.

A pigment excellent in coloring property and heat-resisting property, in particular, thermal decomposition-resisting property is preferable, and normally, organic pigments are utilized. The following color index numbers are examples of the organic pigments that can be used in the coloring composition.

As an organic pigment of a red coloring composition, for example, a red pigment such as C. I. Pigment Red 7, 14, 41, 48:2, 48:3, 48:4, 81:1, 81:2, 81:3, 81:4, 146, 168, 177, 178, 179, 184, 185, 187, 200, 202, 208, 210, 246, 254, 255, 264, 270, 272 or 279 can be used. As an organic pigment of a red coloring composition, a mixture of a red pigment and a yellow pigment may be used. As the yellow pigment, for example, C. I. Pigment Yellow 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 123, 126, 127, 128, 129, 138, 147, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 198, 213 or 214 can be used.

As an organic pigment of a green coloring composition, for example, a green pigment such as C. I. Pigment Green 7, 10, 36 or 37 can be used. As an organic pigment of a green coloring composition, a mixture of a green pigment and a yellow pigment may be used. As the yellow pigment, for example, the same pigments as that described for the red coloring composition can be used.

As an organic pigment of a blue coloring composition, for example, a blue pigment such as C. I. Pigment Blue 15, 15:1, 15:2, 15:3, 15:4, 15:6, 16, 22, 60 or 64 can be used. As an organic pigment of a blue coloring composition, a mixture of a blue pigment and a purple pigment may be used. As the purple pigment, for example, C. I. Pigment Violet 1, 19, 23, 27, 29, 30, 32, 37, 40, 42 or 50 can be used.

As the inorganic pigment, for example, metal oxide powders, metal sulfide powders, or metal powders such as yellow lead ore, zinc yellow, iron red (red oxide of iron (III)), cadmium red, ultramarine blue, chromic oxide green and cobalt green can be used. The inorganic pigment can be used, for example, in combination with the organic pigment in order to achieve excellent application property, sensitivity and developing property while balancing chroma and lightness.

The coloring composition may further contain coloring components other than the pigment. For example, the coloring composition may contain dye if a sufficient thermal resistance can be achieved. In this case, the dye can be used for color matching.

The transparent resin is a resin having a transmittance of preferably 80% or higher, more preferably 95% or higher throughout the entire wavelength range of 400 to 700 nm, which is the visible range. As the material of the transparent resin, i.e., the pigment carrier, for example, transparent resins such as thermoplastic resin, thermosetting resin and photosensitive resin, the precursors thereof, or the mixture thereof can be used. The transparent resin as the pigment carrier is, for example, a thermoplastic resin, a thermosetting resin a photosensitive resin or a mixture containing two or more of them. The precursor of the transparent resin is, for example, monomers and/or oligomers that cure when irradiated with rays.

In the coloring composition, the transparent resin is use at an amount of, for example, 30 to 700 parts by mass, preferably 60 to 450 parts by mass with respect to 100 parts by mass of the pigment. In the case where a mixture of the transparent resin and the precursor thereof is used as the pigment carrier, the transparent resin is used in the coloring composition at an amount of, for example, 20 to 400 parts by mass, preferably 50 to 250 parts by mass with respect to 100 parts by mass of the pigment. In this case, the precursor of the transparent resin is used in the coloring composition at an amount of, for example, 10 to 300 parts by mass, preferably 10 to 200 parts by mass with respect to 100 parts by mass of the pigment.

As the thermoplastic resin, for example, butyral resins, styrene-maleic acid copolymers, chlorinated polyethylenes, polyvinyl chlorides, vinyl chloride-vinyl acetate copolymers, polyvinyl acetates, polyurethane resins, polyester resins, acrylic resins, alkyd resins, polystyrene resins, polyamide resins, rubber-based resins, cyclized rubber resins, celluloses, polybutadiens, polyethylenes, polypropylenes or polyimide resins can be used.

As the thermosetting resin, for example, epoxy resins, benzoguanamine resins, rosin-modified maleic resins, melamine resins, urea resins or phenol resins can be used.

As the photosensitive resin, for example, resins obtained by causing the reaction of an acrylic compound, a methacrylic compound or cinnamic acid having a reactive substituent such as isocyanate group, aldehyde group and epoxy group with a linear polymer having a reactive substituent such as hydroxyl group, carboxyl group and amino group to introduce photo-crosslinking groups such as acryloyl groups, methacryloyl groups and styryl groups into the linear polymer can be used. Alternatively, resins obtained by half-esterifying a linear polymer including acid anhydride such as styrenemaleic anhydride copolymer and α-olefin-maleic anhydride copolymer using acrylic compounds or methacrylic compounds having hydroxyl group such as hydroxyalkyl acrylates and hydroxyalkyl methacrylates may be used.

As the monomers and/or oligomers, which are the precursor of the transparent resin, for example, acrylic esters and methacrylic esters such as 2-hydroxyethyl acrylate, 2-hydroxyetyl methacrylate, 2-hydroxypropyl acrylate, 2-hydroxypropyl methacrylate, cycrohexyl acrylate, cycrohexyl methacrylate, polyethylene glycol diacrylate, polyethylene glycol dimethacrylate, pentaerythritol triacrylate, pentaerythritol trimethacrylate, trimethylolpropane triacrylate, trimethylolpropane trimethacrylate, dipentaerythritol hexaacrylate, dipentaerythritol hexamethacrylate, tricyclodecanyl acrylate, tricyclodecanyl methacrylate, melamine acrylate, melamine methacrylate, epoxy acrylate and epoxy methacrylate; acrylic acid, methacrylic acid, styrene, vinyl acetate, acrylamide, methacrylamide, N-hydroxymethyl acrylamide, N-hydroxymethyl methacrylamide or a mixture containing two or more of them can be used.

In the case where the coloring composition is cured using light such as ultraviolet rays, for example, a photo-polymerization initiator is added to the coloring composition.

As the photo-polymerization initiator, for example, acetophenone-based photo-polymerization initiator such as 4-phenoxydichloroacetophenone, 4-t-butyl-dichloroacetophenone, diethoxyacetophenone, 1-(4-isopropylphenyl)-2-hydroxy-2-methylpropane-1-one, 1-hydroxycyclohexylphenylketone, 2-methyl-1[4-(methylthio)phenyl]-2-morpholinopropane-1-one and 2-benzyl-2-dimethylamino-1-(4-morpholinophenyl)-butane-1-one; benzoin-based photo-polymerization initiator such benzoin, benzoylbenzoate, methylbenzoylbenzoate, 4-phenylbenzophenone, hydroxybenzophenone, acrylated benzophenone and 4-benzoyl-4'-methyldiphenyl sulfide; thioxanthone-based photo-polymerization initiator such as thioxanthone, 2-chlorothioxanthone, 2-methyltioxanthone, isopropylthioxanthone and 2,4-diisopropylthioxanthone; triazine-based photo-polymerization initiator such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis(trichloromethyl)-6-styryl-s-triaine, 2-(naphto-1-yl)-4,6-bis(trichloromethyl)-s-triazine, 2-(4-methoxy-naphto-1-yl)-4,6-bis(trichloromethyl)-s-triazine, 2,4-trichloromethyl(piperonyl)-6-triazine and 2,4-trichloromethyl(4'-methoxystyryl)-6-triazine; borate-based photo-polymerization initiator; carbazole-based photo-polymerization initiator; imidazole-based photo-polymerization initiator; or a mixture containing two or more of them can be used.

The photo-polymerization initiator is used in the coloring composition at an amount of, for example, 5 to 200 parts by mass, preferably 10 to 150 parts by mass with respect to 100 parts by mass of the pigment.

A sensitizer may be used together with the photo-polymerization initiator.

As the sensitizer, a compound such as α-acyloxy ester, acylphosphine oxide, methylphenyl glyoxylate, benzil, 9,10-phenanthrenequinone, camphor quinone, ethyl anthraquinone, 4,4'-diethyl isophthaloquinone, 3,3',4,4'-tetra (t-butylperoxycarbonyl)benzophenone and 4,4'-diehylamino benzophenone can be used.

The sensitizer is used at an amount of, for example, 0.1 to 60 parts by mass with respect to 100 parts by mass of the photo-polymerization initiator.

The coloring composition may further contain a chain transfer agent such as multi-functional thiol.

A multi-functional thiol is a compound having two or more thiol groups. As the multi-functional thiol, for example, hexanedithiol, decanedithiol, 1,4-butanediol bisthiopropionate, 1,4-butanediol bisthioglycolate, ethylene glycol bisthioglycolate, ethylene glycol bisthiopropionate, trimethylolpropane tristhioglycolate, trimethylolpropane tristhiopropionate, trimethylolpropane tris(3-mercaptobutyrate), pentaerythritol tetrakisthioglycolate, pentaerythritol tetrakisthiopropionate, trimercaptopropionic tris(2-hydroxyethyl) isocyanurate, 1,4-dimethylmercaptobenzene, 2,4,6-trimercapto-s-triazine, 2-(N,N-dibutylamino)-4,6-dimercapto-s-triazine or a mixture containing two or more of them can be used.

The multi-functional thiol is used in the coloring composition at an amount of, for example, 0.2 to 150 parts by mass, preferably 0.2 to 100 parts by mass with respect to 100 parts by mass of the pigment.

The coloring composition may further contain a solvent. When the solvent is used, the dispersibility of the pigment increases. As a result, the coloring composition can be easily applied to the substrate 110 at a dried thickness of, for example, 0.2 to 5 μm.

As the solvent, for example, cyclohexanone, ethyl cellosolve acetate, butyl cellosolve acetate, 1-methoxy-2-propyl acetate, diethylene glycol dimethoxy ether, ethyl benzene, ethylene, glycol diethyl ether, xylene, ethyl cellosolve, methyl-n amyl ketone, propylene glycol monomethyl ether, toluene, methyl ethyl ketone, ethyl acetate, methanol, ethanol, isopropyl alcohol, butanol, isobutyl ketone, petroleum solvent, or a mixture containing two or more of them can be used.

The solvent is used in the coloring composition at an amount of, for example, 800 to 4,000 parts by mass, preferably 1,000 to 2,500 parts by mass with respect to 100 parts by mass of the pigment.

The coloring composition can be manufactured, for example, by finely dispersing one or more pigment into the pigment carrier and the organic solvent together with the above-described photo-polymerization initiator as needed using a dispersing device such as three-roll mill, two-roll mill, sand mill, kneader and attritor. A coloring composition containing two or more pigments may be manufactured by preparing dispersions containing different pigments and mixing the dispersions together.

When dispersing the pigment into the pigment carrier and the solvent, a dispersion aid such as resin-type pigment-dispersing agent, surfactant and pigment derivative may be used.

The dispersion aid increases the dispersibility of the pigment and suppresses the reaggregation of the dispersed pigment. Therefore, in the case of using a coloring composition prepared by dispersing a pigment into a pigment carrier and a solvent using a dispersion aid, a color filter excellent in transparency can be obtained.

The dispersion aid is used in the coloring composition at an amount of, for example, 0.1 to 40 parts by mass, preferably 0.1 to 30 parts by mass with respect to 100 parts by mass of the pigment.

The resin-type pigment-dispersing agent includes a pigment-affinitive moiety having a property of undergoing adsorption by the pigment and a moiety having a compatibility with the pigment carrier. The resin-type pigment-dispersing agent is adsorbed by the pigment so as to stabilize the dispersibility of the pigment in the pigment carrier.

As the resin-type pigment-dispersing agent, for example, an oil-based dispersing agent such as polyurethane, polycarboxylate, e.g. polyacrylate, unsaturated polyamide, polycarboxylic acid, partial amine salt of polycarboxylic acid, ammonium polycarboxylate, alkylamine polycarboxylate, polysiloxane, long-chain polyaminoamide phosphate and hydroxyl group-containing polycarboxylate, modified compounds thereof, amide produced through a reaction of poly (lower alkylene imine) with polyester having a free carboxyl group and a salt thereof; water-soluble resin or water-soluble macromolecular compound such as acrylic acid-styrene copolymer, methacrylic acid-styrene copolymer, acrylic acid-acrylate copolymer, acrylic acid-methacrylate copolymer, methacrylic acid-acrylate copolymer, methacrylic acid-methacrylate copolymer, styrene-maleic acid copolymer, polyvinyl alcohol and polyvinyl pyrrolidone; polyester; modified polyacrylate; ethylene oxide/propylene oxide adduct; phosphate; or a compound containing two or more of them can be used.

As the surfactant, for example, an anionic surfactant such as polyoxyethylene alkylether sulfate, dodecylbenzene sodium sulfonate, alkali salt of styrene-acrylic acid copolymer, alkylnaphthaline sodium sulfonate, alkyldiphenyl ether sodium disulfonate, monoethanol amine lauryl sulfate, triethanol amine lauryl sulfate, ammonium lauryl sulfate, monoethanol amine stearate, sodium stearate, sodium lauryl sulfate, monoethanol amine of styrene-acrylic acid copolymer and polyoxyethylene alkylether phosphate; a nonionic surfactant such as polyoxyethylene oleyl ether, polyoxyethylene lauryl ether, polyoxyethylene nonylphenyl ether, polyoxyethylene alkylether phosphate, polyoxyethylene sorbitan monostearate and polyethyleneglycol monolaurate; a cationic surfactant such as alkyl quaternary ammonium salt and an ethylene oxide adduct thereof; an amphoteric surfactant such as alkyl betaine, e.g. betaine alkyldimethyl aminoacetate and alkylimidazoline; and a mixture containing two or more of them can be used.

The dye derivative is a compound produced by introducing a substituent into an organic dye. Although the dye derivative is similar in hue to the pigment used, the hue of the former may be different from that of the latter if the loading thereof is small. Note that the term "organic dye" includes aromatic polycyclic compounds exhibiting a light yellow color such as naphthalene-based compounds and anthraquinone-based compounds, which are generally not referred to as "dye", in addition to compounds generally referred to as "dye". As the dye derivative, for example, those described in JP-A 63-305173, JP-B 57-15620, JP-B 59-40172, JP-B 63-17102 or JP-B 5-9469 can be used. Especially, the dye derivatives having a basic group are highly effective in the dispersion of pigment. The coloring composition may contain a single dye derivative or a plurality of dye derivatives.

A storage-stability improver may be added to the coloring composition in order to improve the temporal stability of its viscosity. As the storage-stability improver, for example, benzyltrimethyl chloride; quaternary ammonium chloride such as diethylhydroxy amine; organic acid such as lactic acid and oxalic acid; methyl ether of the organic acid; t-butyl pyrocatechol; organic phosphine such as tetraethyl phosphine and tetraphenyl phosphine; phosphite; or a mixture containing two or more of them can be used.

The storage-stability improver is contained in the coloring composition at an amount of, for example, 0.1 to 10 parts by mass with respect to 100 parts by mass of the pigment.

To the coloring composition, an adhesion improver such as silane coupling agent may be added in order to improve the adhesion to the substrate.

As the silane coupling agent, for example, vinyl silane such as vinyl tris(β-methoxyethoxy)silane, vinylethoxy silane and vinyltrimethoxy silane; acrylsilane and metacrylsilane such as γ-methacryloxypropyl trimethoxy silane; epoxy silane such as β-(3,4-epoxycyclohexyl)ethyltrimethoxy silane, β-(3,4-epoxycyclohexyl)methyltrimethoxy silane, β-(3,4-epoxycyclohexyl)ethyltriethoxy silane, β-(3,4-epoxycyclohexyl)methyltriethoxy silane, γ-glycidoxypropyl trimethoxy silane and γ-glycidoxypropyl triethoxy silane; amino silane such as N-β(aminoethyl) γ-aminopropyl trimethoxy silane, N-β(aminoethyl) γ-aminopropyl triethoxy silane, N-β(aminoethyl) γ-aminopropyl methyldiethoxy silane, γ-aminopropyl triethoxy silane, γ-aminopropyl trimethoxy silane, N-phenyl-γ-aminopropyl trimethoxy silane and N-phenyl-γ-aminopropyl triethoxy silane; thiosilane such as γ-mercaptopropyl trimethoxy silane and γ-mercaptopropyl triethoxy silane; or a mixture containing two or more of them can be used.

The silane coupling agent is contained in the coloring composition at an amount of, for example, 0.01 to 100 parts by mass with respect to 100 parts by mass of the pigment.

The coloring composition can be prepared in the form of a gravure offset printing ink, a waterless offset printing ink, a silk screen printing ink, or a solvent developer-type or alkaline developer-type colored resist. The colored resist is the one that is obtained by dispersing dye in a composition containing a thermoplastic resin, thermosetting resin or photosensitive resin, a monomer, a photo-polymerization initiator and an organic solvent.

The pigment is used at an amount of, for example, 5 to 70 parts by mass, preferably 20 to 50 parts by mass with respect to 100 parts by mass of the total solid contents in the coloring composition. Note that most of the remainder of the solid contents in the coloring layer is the resin binder included in the pigment carrier.

Prior to using the coloring composition for forming a film, particles having a size of 5 μm or more, preferably 1 μm or more, more preferably 0.5 μm or more may be removed from the coloring composition using a refiner such as centrifugal separator, sintered filter and membrane filter.

Each of the coloring layers 120a to 120c can by formed, for example, by printing. According to printing, printing using the coloring composition and drying it thereafter can form each of the coloring layers 120a to 120c. Therefore, the printing method is low cost and excellent in mass productivity. Further, since the printing technique is improved in recent years, printing can form fine patterns having high dimension accuracy and high smoothness.

In the case where printing is used, the coloring composition should be designed to have a composition that would not cause the coloring composition to be dried and solidified on the printing plate or the blanket. Also, in the printing, it is important to optimize the flowability of the coloring composition in the printer. Therefore, a dispersing agent or an extender may be added to the coloring composition so as to adjust the viscosity thereof.

Each of the coloring layers 120a to 120c may be formed using photolithography. According to photolithography, the color filter layer 120 can be formed with higher accuracy as compared with the case where printing is utilized.

In this case, the coloring composition prepared as a solvent developer-type or alkaline developer-type colored resist is applied first to the substrate 110. For this application, an application method such as spray coating, spin coating, slit coating and roll coating is utilized. The coated film is formed to have a dried thickness of, for example, 0.2 to 10 μm.

Next, the coated film is dried. For example a vacuum drier, a convection oven, an IR oven or a hot plate is used for drying the coated film. Drying the coated film can be omitted.

Subsequently, the coated film is irradiated with ultraviolet rays via a photomask. That is, the coated film is subjected to a pattern exposure.

Then, the coated film is immersed in a solvent developer or an alkaline developer. Alternatively, the coated film is sprayed with the developer. Thus, soluble portions are removed from the coated film to obtain the coloring layer 120a as a resist pattern.

Further, by the same method as described above, the coloring layers 120b and 120c are formed in this order. Thus, the color filter layer 120 is obtained. Note that in this method, a heat treatment may be executed in order to promote the polymerization of the colored resists.

In the photolithography process, for example, an aqueous solution of sodium carbonate or sodium hydroxide can be used as the alkaline developer. Alternatively, a liquid containing an organic alkali such as dimethylbenzyl amine and triethanol amine may be used as the alkaline developer.

An additive such as defoaming agent or surfactant may be added to the developer. A shower developing method, for example, a spray developing method, a dip developing method or a paddle developing method may be utilized for developing.

In order to enhance the sensitivity to light exposure, the following process may be further executed. That is, after drying the first coated film of the colored resist, an alkaline-soluble resin, for example, polyvinyl alcohol or water-soluble acrylic resin is applied to the first coated film. After drying the second coated film, the above-described pattern exposure is performed. The second coated film prevents the polymerization in the first coated film from being inhibited by oxygen. Therefore, a higher sensitivity to light exposure can be achieved.

The color filter layer 120 may be formed by other methods. For example, it may be formed using an inkjet method, an electrodeposition method or a transfer method. In the case where the color filter layer 120 is formed using the inkjet method, each coloring layer is obtained, for example, by forming a light-shielding partition wall on the substrate 110 in advance and injecting an ink from a nozzle toward regions separated by the light-shielding partition wall. In the case where the color filter layer 120 is formed using the electrodeposition method, each coloring layer is obtained, for example, by forming a transparent conductive layer on the substrate 110 in advance and depositing the coloring composition on the transparent conductive film utilizing an electrophoresis of colloidal particles made of the coloring composition. In the case where the transfer method is used, the color filter layer 120 is formed on a surface of a releasable transfer base sheet in advance, and then the color filter layer 120 is transferred from the base sheet onto the substrate 110.

Next, a method for manufacturing the solidified liquid crystal layer 130 will be described.

Figure 4:
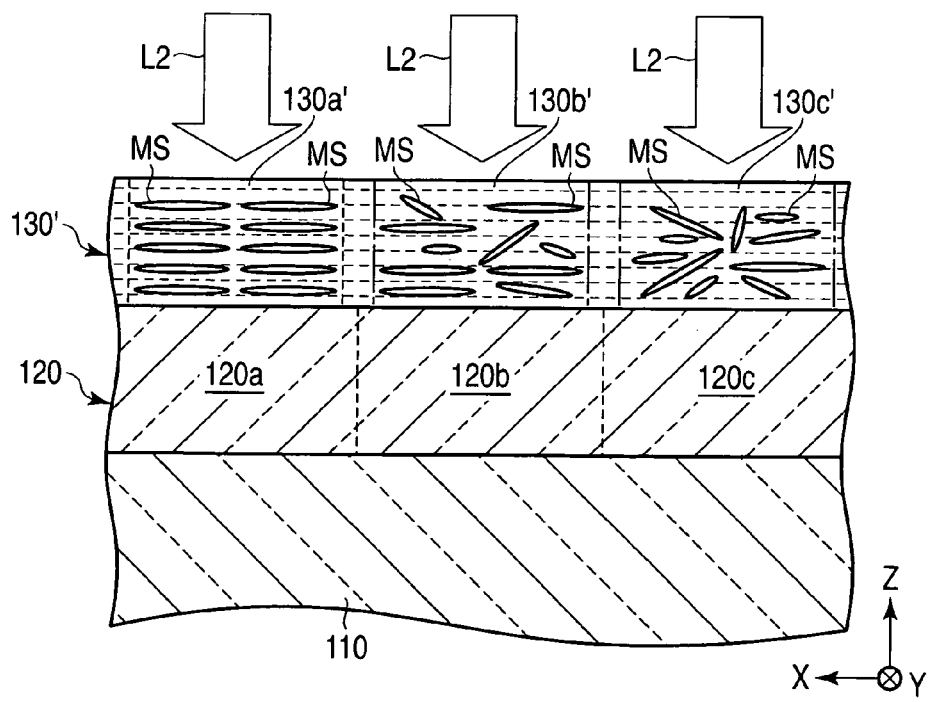
FIG. 4 is a sectional view schematically showing an example of a method of forming a solidified liquid crystal layer.

FIGS. 3 and 4 are sectional views schematically showing an example of a method of forming a solidified liquid crystal layer.

The solidified liquid crystal layer 130 is obtained, for example, by performing a process of forming a liquid crystal material layer 130' containing a photo-polymerizing or photo-crosslinking thermotropic liquid crystal material on the color filter layer 120 and subjecting the liquid crystal material layer 130' to a pattern exposure and a heat treatment.

The liquid crystal material layer 130' can be obtained, for example, by applying a coating solution containing a thermotropic liquid crystal compound on the color filter layer 120 and drying the coated film, if necessary. In the liquid crystal material layer 130', the mesogens of the thermotropic liquid crystal compound form an alignment structure.

In addition to the thermotropic liquid crystal compound, components such as solvent, chiral agent, photo-polymerization initiator, thermal polymerization initiator, sensitizer, chain transfer agent, multi-functional monomer and/or oligomer, resin, surfactant, storage-stability improver and adhesion improver can be added to the coating solution to the extent that the composition containing the liquid crystal compound does not lose mesomorphism.

As the thermotropic liquid crystal compound, for example, alkyl cyanobiphenyl, alkoxy biphenyl, alkyl terphenyl, phenyl cyclohexane, biphenyl cyclohexane, phenyl bicyclohexane, pyrimidine, cyclohexane carboxylic acid ester, halogenated cyanophenol ester, alkyl benzoic acid ester, alkyl cyanotolane, dialkoxy tolane, alkyl alkoxy tolane, alkyl cyclohexyl tolane, alkyl bicyclohexane, cyclohexyl phenyl ethylene, alkyl cyclohexyl cyclohexene, alkyl benzaldehyde azine, alkenyl benzaldehyde azine, phenyl naphthalene, phenyl tetrahydronaphtalene, phenyl decahydronaphthalene, derivatives thereof, or acrylates of the compounds can be used.

As the photo-polymerization initiator, sensitizer, chain transfer agent, multi-functional monomer and/or oligomer, resin, surfactant, storage-stability improver and adhesion improver, for example, the same materials as that exemplified for the coloring composition can be used. Also, as the solvent, for example, the same materials as that exemplified for the coloring composition can be used.

For applying the coating solution, for example, a printing method such as spin coating, slit coating, relief printing, screen printing, planographic printing, reverse printing and gravure printing; the printing method incorporated into an offset system; an inkjet method; or bar coat method can be used.

The liquid crystal material layer 130' is formed, for example, as a continuous layer having a uniform thickness. According to the method described above, the liquid crystal material layer 130' can be formed as a continuous film having a uniform thickness as long as the surface to be coated is sufficiently flat.

Prior to the application of the coating solution, the surface of the color filter layer 120 may be subjected to an alignment process such as rubbing process. Alternatively, prior to the application of the coating solution, an alignment layer for regulating the orientation of the liquid crystal compound may be formed on the color filter layer 120. For example, forming a transparent layer of resin such as polyimide on the color filter layer 120 and subjecting the transparent resin layer to an alignment process such as rubbing process can obtain the alignment layer. The alignment layer may be formed using a photo-alignment technique.

Then, an exposure process is performed. That is, as shown in FIG. 3, regions of the liquid crystal material layer 130' are irradiated with light L1 at different exposure values. For example, the region 130a' of the liquid crystal material layer 130' that corresponds to the region 130a is irradiated with the light L1 at the maximum exposure value. The region 130b' of the liquid crystal material layer 130' that corresponds to the region 130b is irradiated with the light L1 at an exposure value lower than that for the region 130a'. The region 130c' of the liquid crystal material layer 130' that corresponds to the region 130c is irradiated with the light L1 at an exposure value lower than that for the region 130b' or not irradiated with the light L1. Thus, at the portions of the liquid crystal material layer 130' that are irradiated with the light L1, the thermotropic liquid crystal compound polymerizes or forms crosslinks while maintaining the alignment structure of the mesogens. In the polymerization or crosslinking product of the thermotropic liquid crystal compound, the mesogenic groups are immobilized.

The region 130a' irradiated with light at the maximum exposure value is the highest in the content of the polymerization or crosslinking product of the thermotropic liquid crystal compound and the lowest in the unpolymerized or uncrosslinked thermotropic liquid crystal compound. The region 130b' irradiated with light at the exposure value lower than that for the region 130a' is lower in the content of the polymerization or crosslinking product of the thermotropic liquid crystal compound and higher in the content of the unpolymerized or uncrosslinked thermotropic liquid crystal compound than the region 130a'. The region 130c' irradiated with light at the exposure value lower than that for the region 130b' is lower in the content of the polymerization or crosslinking product of the thermotropic liquid crystal compound and higher in the content of the unpolymerized or uncrosslinked thermotropic liquid crystal compound than the region 130b'. For example, the whole thermotropic liquid crystal compound in the region 130a' is polymerized or crosslinked, only a part of the liquid crystal compound in the region 130b' is polymerized or crosslinked, and almost no thermotropic liquid crystal compound in the region 130c' is polymerized or crosslinked.

The light L1 used in the exposure process is electromagnetic waves such as ultraviolet rays, visible rays and infrared rays. An electron beam may be used instead of the electromagnetic waves. Only one of them may be used as the light L1. Alternatively, two or more of them may be used as the light L1.

The exposure process may be performed by any method as long as the above-described nonuniform polymerization or crosslinking can be caused.

For example, the exposure process may include an exposure using a certain photomask and another exposure using a photomask different in a pattern of a light-shielding layer from the former. In this case, for example, the whole liquid crystal material layer 130' is irradiated with the light L1, then, only the regions 130a' and 130b' are irradiated with the light L1 using a certain photomask, and finally, only the region 130a is irradiated with the light L1 using another photomask.

Alternatively, the exposure process may include an exposure for the region 130a' using a certain photomask, another exposure for the region 130b' using the same photomask, and an optional exposure for the region 130c' using the same photomask. In this case, for example, the region 130a' is irradiated with the light L1 at the maximum exposure value using a certain photomask, the region 130b' is irradiated with the light L1 at an exposure value lower than that for the region 130a' using this photomask, and the region 130c' is irradiated with the light L1 at an exposure value lower than that for the region 130b' using the same photomask.

Alternatively, the exposure process may include an exposure using a halftone mask. For example, the liquid crystal material layer 130' is irradiated with the light through a halftone mask provided with a light-shielding layer and a semitransparent layer at positions corresponding to the regions 130c' and 130c', respectively. Instead of the halftone mask, a gray-tone mask or a wavelength-limiting mask may be used. The gray-tone mask has the same structure as that of the halftone mask except that the semitransparent layer is omitted and it further includes at a position corresponding to the region 130b' a light-shielding layer, which is provide with slits each having a width equal to or smaller than the resolution of the light-exposure apparatus. The light-limiting mask includes portions different in wavelength range of light allowed to pass through.

Alternatively, the liquid crystal material layer 130' may be scanned with rays or luminous flux such as electron beam instead of using a photomask.

Alternatively, the above-described techniques may be combined together.

In the exposure process, the values of illuminance for the regions 130a' to 130c' may differ from one another. For example, even in the case where the exposure values for the regions 130a' to 130c' are equal to one another, the regions 130a' to 130c' will have different contents of the unpolymerized or uncrosslinked thermotropic liquid crystal compound if the values of illuminance for the regions 130a' to 130c differ from one another. Specifically, when the value of illuminance is increased while the exposure value kept constant, the content of the unpolymerized or uncrosslinked thermotropic liquid crystal compound will be decreased.

In the exposure process, the regions 130a' to 130c' may be exposed to lights of different emission lines. For example, even in the case where the exposure values for the regions 130a' to 130c' are equal to one another, the regions 130a' to 130c' will have different contents of the unpolymerized or uncrosslinked thermotropic liquid crystal compound if different emission lines are used.

In the exposure process, a deviation of temperature at each position of the substrate 110 from an average temperature of the substrate 110 is maintained within 3° C. Further, in the exposure process, a variation in the average temperature with time is maintained within 3° C. When the degree of the deviation or variation is great, the degrees of depolarization D will vary widely.

In the exposure process, the temperature of the substrate 110 is maintained sufficiently low. For example, the average temperature of the substrate 110 is maintained 30° C. or lower. When the temperature of the substrate 110 is excessively high, the degrees of depolarization D will be high.

Typically, the exposure process is performed in an atmosphere containing oxygen at a concentration that corresponds to 0.1% by volume or higher at atmospheric pressure. For example, the exposure process is performed in the atmosphere. In the case where oxygen is absent or the amount of oxygen is extremely small in the exposure process, it is difficult to produce the regions containing the polymerization or crosslinking product at different concentrations. The reason for this is considered to be as follows. That is, the fact that oxygen hinders radical polymerizations relates to the phenomenon that a region for which the exposure value is small contains a large amount of unreacted compound.

Supposing that a birefringence $\Delta n$ is the birefringence of the region 130a achieved when the maximum exposure value in the exposure process is set at 1,000 mJ/cm$^2$ and that an exposure value E is the minimum exposure value for the region 130a' which allows the region 130a to have a birefringence equal to or higher than 97% of the birefringence in, the exposure values for the regions 130a' to 130c' in the exposure process may be 75% or less of the exposure value E. When the exposure values are excessively great, the flatness of the surface of the solidified liquid crystal layer 130 will be degraded and the haze will increase.

After completing the exposure process, a developing process is performed. That is, the liquid crystal material layer 130' is heated to a temperature equal to or higher than the phase transition temperature at which the thermotropic liquid crystal compound changes from a liquid crystal phase to an isotropic phase. The mesogens of the thermotropic liquid crystal compound as an unreacted compound are not immobilized. Therefore, when the liquid crystal material layer 130' is heated to the phase transition temperature or higher, the degree of orientation of the mesogens is lowered. For example, the mesogens of the unreacted compound changes from the liquid crystal phase to the isotropic phase. On the other hand, the mesogens of the polymerization or crosslinking product of the thermotropic liquid crystal compound are immobilized.

Therefore, as shown in FIG. 4, the degree of orientation of the mesogens MS in the region 130b' becomes lower than that in the region 130a'. Also, the degree of orientation of the mesogens MS in the region 130c' becomes lower than that in the region 130b'. For example, the heat treatment causes in the region 130a' almost no change in the degree of orientation of the mesogens MS. The heat treatment degreases the degree of orientation of the mesogens MS decreases in the region 130b'. And, the heat treatment destroys the alignment structure of the mesogens MS in the region 130c'.

Typically, the developing process is performed in an atmosphere containing oxygen at a concentration that corresponds to 0.1% by volume or higher at atmospheric pressure. For example, the developing process is performed in the atmosphere. In the case where the amount of oxygen is extremely small in the developing process, there is a possibility that a part of the unreacted compound causes polymerization and/or crosslinking under the temperature condition for the developing process. In this case, the degree of orientation of the mesogens of the unreacted compound cannot be lowered uniformly, and thus the haze of the solidified liquid crystal layer 130 will be greater.

In the developing process, the temperature of the substrate 110 may be kept constant or be changed continuously. In the latter case, the temperature of the substrate 110 may be increased continuously from the temperature in the exposure process to the temperature in the fixing process described below.

Then, a fixing process is performed in which the unreacted compound is polymerized and/or crosslinked while the degree of orientation of the mesogens of the unreacted compound kept lowered.

For example, the exposure process shown in FIG. 4 is performed. That is, the entire liquid crystal compound layer 130' is irradiated with light L2 while keeping the temperature of the liquid crystal compound layer 130' higher than the phase transition temperature at which the thermotropic liquid crystal compound changes from the isotropic phase to the liquid crystal phase. The liquid crystal compound layer 130' is irradiated with the light L2 at an exposure value sufficient for almost the whole unreacted compound to cause the polymerization and/or crosslinking reaction. Thus, the unreacted compound is polymerized or crosslinked to immobilize the mesogens whose degree of orientation has been lowered. As above, the solidified liquid crystal layer 130 is obtained.

Note that a first phase transition temperature of some liquid crystal compounds at which an isotropic phase changes to a liquid crystal phase is lower than a second phase transition temperature at which the liquid crystal phase changes to the isotropic phase. Therefore, in particular cases, the temperature of the liquid crystal compound layer 130' in the exposure process may be lower than the heating temperature in the developing process. However, in ordinary cases, the temperature of the liquid crystal compound layer 130' in the exposure process is set at the first phase transition temperature or higher in terms of convenient.

As the light L2, the same light as that described for the light L1 can be used. The light L2 and the light L1 may be the same or not.

In the fixing process, the exposure value may be uniform throughout the entire liquid crystal compound layer 130'. In this case, it is unnecessary to use a photomask provided with a fine pattern. Therefore, in this case, the process can be simplified.

Alternatively, the fixing process may be performed such that the regions 130a' to 130c' are equal in total exposure value, which is the sum of exposure values in the exposure and fixing processes, to one another. For example, in the case where the total exposure value of the region 130a' is remarkably higher than the total exposure value of the region 130c', it is possible that the region 130a' and/or the coloring layer 120a are damaged undesirably. When the total exposure values of the region 130a' to 130c' are equal to one another, such damage can be prevented.

The polymerization and/or crosslinking of the unreacted compound can be performed by other methods.

For example, in the case where the unreacted compound, i.e., the thermotropic liquid crystal compound is a substance that causes polymerization and/or crosslinking when heated to a polymerization and/or crosslinking temperature higher than the first phase transition temperature, a heat treatment may be performed instead of the light exposure in the fixing process. Specifically, instead of the light exposure, the liquid crystal material layer 130 is heated to the polymerization and/or crosslinking temperature or higher to cause the polymerization and/or crosslinking of the unreacted compound. Thus, the solidified liquid crystal layer 130 is obtained. Note that the heating temperature in the developing process is set, for example, equal to or higher than the first phase transition temperature and lower than the polymerization and/or crosslinking temperature.

Alternatively, in the fixing process, the light exposure and the heat treatment may be performed in this order instead of performing only one of the light exposure and the heat treatment. When the light exposure and the heat treatment are combined together as above, the polymerization and/or crosslinking of the unreacted compound can proceed with a higher degree of reliability. Therefore, a stronger solidified liquid crystal layer 130 can be obtained.

In the case where the unreacted compound is the substance that causes polymerization and/or crosslinking when heated to a certain temperature, the heating temperature in the developing process may be equal to or higher than the temperature at which it causes polymerization and/or crosslinking. However, in this case, the decreases in the degree of orientation and the polymerization and/or crosslinking proceed simultaneously. For this reason, the influence of the manufacturing conditions on the optical properties of the solidified liquid crystal layer is comparatively large.

The fixing process is performed in an oxygen-free atmosphere or an atmosphere containing oxygen at a concentration that corresponds to 5% by volume or lower at atmospheric pressure. In the case where the oxygen concentration of the atmosphere is high, the polymerization and/or crosslinking of the unreacted compound is hindered, and thus obtaining a solidified liquid crystal layer 130 excellent in heat resistance will be difficult. Further, in this case, the contrast ratio $CR_{RE}$ will be smaller than the target value.

In the fixing process, a deviation of temperature at each position of the substrate 110 from an average temperature of the substrate 110 is maintained, for example, within 10° C. When the degree of the deviation is great, it is difficult to achieve desired optical properties in each of the regions 130a to 130c.

Meanwhile, in the case where a developing process utilizing a developing liquid is performed after the exposure process, obtained is the solidified liquid crystal layer that includes regions equal in refractive index anisotropy to each other and different in thickness from each other. The regions cause different retardations because they are different in thickness from each other.

However, conditions of a wet process, in particular, a development is difficult to control precisely, and these conditions greatly affect the optical properties of the final product. For this reason, according to the method including a wet process, deviations of the optical properties from the target values prone to occur.

In contrast, according to the method described with reference to FIGS. 3 and 4, no wet process is performed in the exposure process or later. Therefore, according to this method, it is possible to prevent the deviation of the refractive index anisotropy from the target value due to the wet process.

Note that the refractive index anisotropy and the exposure value in the exposure process are not always in a proportional relation. However, under the conditions in which materials and the exposure values are unchanged, the reproducibility of the refractive index anisotropy is high. Therefore, the conditions, for example, an exposure value necessary for achieving certain refractive index anisotropy can be found out easily, and a stable manufacture can be done easily.

Various modifications can be made to the retardation substrate 10 described with reference to FIGS. 1 to 4, i.e., a panel substrate.

In the retardation substrate 10, the solidified liquid crystal layer 130 includes the regions 130a to 130c different in refractive index anisotropy. The solidified liquid crystal layer 130 may further include one or more regions different in refractive index anisotropy from the regions 130a to 130c. For example, in a semi-transparent liquid crystal display, each of the red, green and blue pixels includes a transmissive portion and a reflective portion. The transmissive portion and the reflective portion need to be designed separately. Therefore, each of the portions of the solidified liquid crystal layer 130 that correspond to the red, green and blue pixels may include two or more regions different in refractive index anisotropy from each other.

The color filter layer 120 may be omitted from the retardation substrate 10. For example, in a liquid crystal display, one of the substrates may include both a color filter layer and a retardation layer. Alternatively, it is possible that one substrate of a liquid crystal display includes a color filter layer and the other substrate includes a retardation layer. In the latter case, it is not necessary that the retardation substrate 10 includes the color filter layer 120. However, in the case where the retardation substrate 10 includes both the color filter layer 120 and the solidified liquid crystal layer 130, an alignment between the color filter layer 120 and the solidified is unnecessary when bonding them together.

The solidified liquid crystal layer 130 may be interposed between the substrate 110 and the color filter layer 120.

Figure 5:
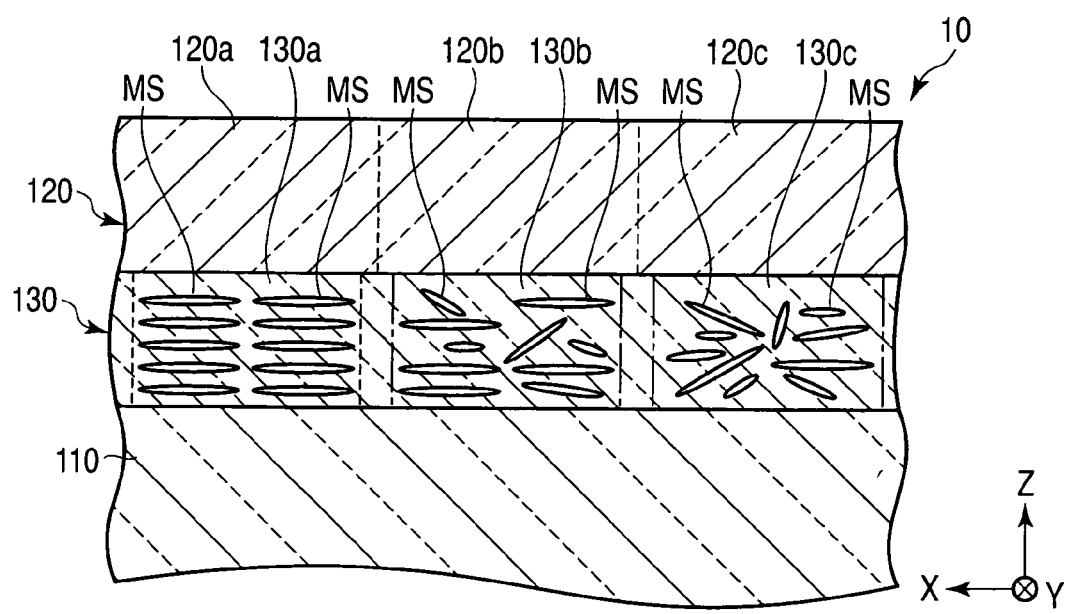
FIG. 5 is a sectional view schematically showing a retardation substrate according to a modified example.

FIG. 5 is a sectional view schematically showing a retardation substrate according to a modified example. This retardation substrate 10 is the same as the retardation substrate 10 described with reference to FIGS. 1 to 4 except that the solidified liquid crystal layer 130 is interposed between the substrate 110 and the color filter layer 120.

In the case where such a structure is employed, for example, in a liquid crystal display including the retardation layer 10, the solidified liquid crystal layer 130 does not suppress the inclusion of impurities from the color filter layer 120 into the liquid crystal layer. However, in the case where this structure is employed, there is no possibility that the color filter layer 120 is subjected to the light exposure and the heat treatment for forming the solidified liquid crystal layer 130. Therefore, in the case where such a structure is employed, deteriorations of the color filter layer 120 due to the above-described light exposure and the heat treatment are less prone to occur as compared with the case where the structure shown in FIGS. 1 and 2 is employed.

Further, in the case where this structure is employed, the color filter layer 120 can be formed on the solidified liquid crystal layer 130. Typically, the surface of the solidified liquid crystal layer 120 is roughly flat. Therefore, in this case, the color filter layer 120 that derivers the design performance can be obtained more easily as compared with the case where the color filter layer 120 is formed on a surface provided with a relief structure.

The above-described retardation substrate 10 can be used for various applications. For example, the retardation substrate 10 can be used in display techniques typified by a liquid crystal display technique.

Figure 6:
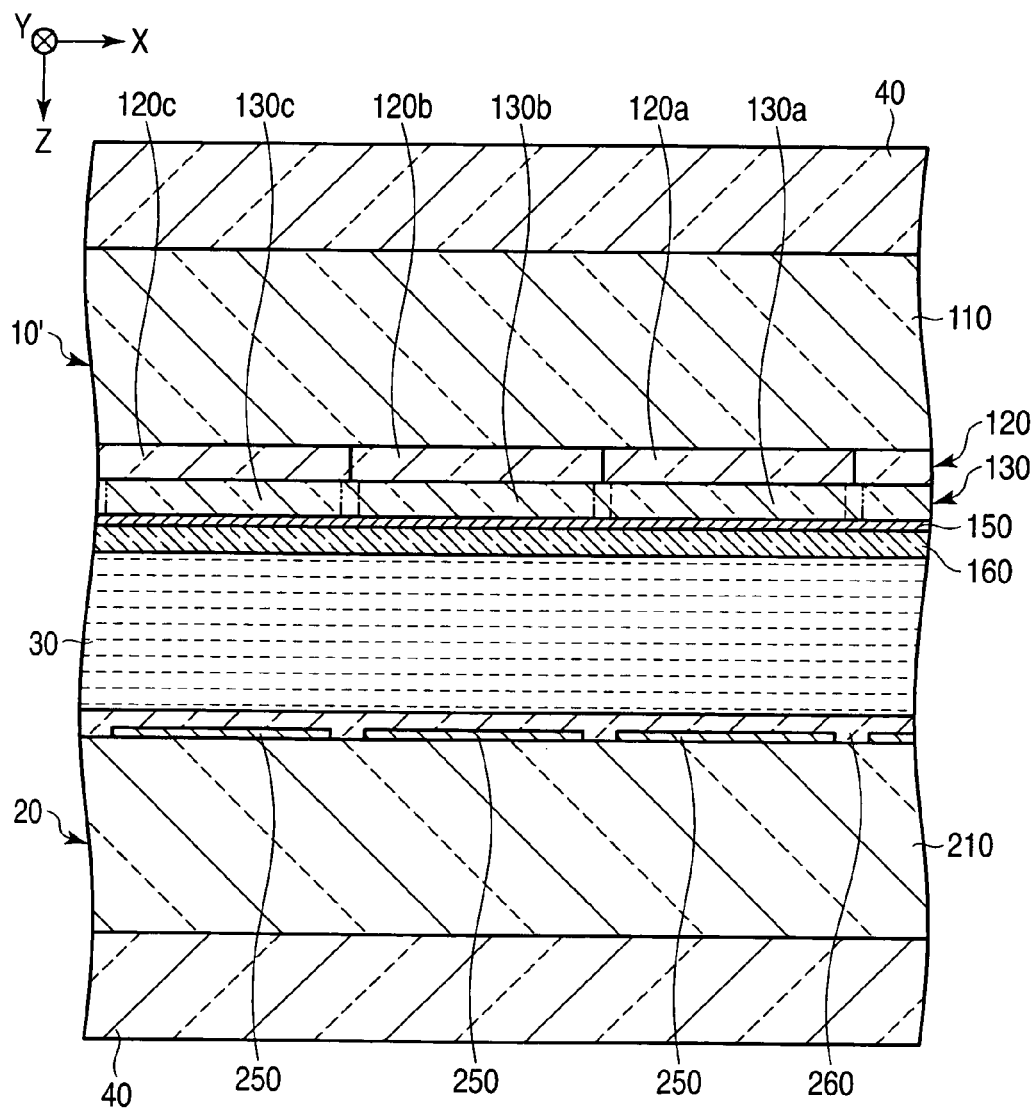
FIG. 6 is an example of a liquid crystal display that can be manufactured using the retardation substrate shown in FIGS. 1 and 2.

FIG. 6 is an example of a liquid crystal display that can be manufactured using the retardation substrate shown in FIGS. 1 and 2.

The liquid crystal display shown in FIG. 6 is a transmissive liquid crystal display employing an active matrix driving method. The liquid crystal display includes a color filter substrate 10', an array substrate 20, a liquid crystal layer 30, a pair of polarizing plates 40, and a backlight (not shown).

The color filter substrate 10' includes the retardation substrate 10 described above, a counter electrode 150, and an alignment layer 160.

The counter electrode 150 is formed on the solidified liquid crystal layer 130. It is a continuous film extending over the display area. The counter electrode 150 is, for example, made of the above-described transparent conductor.

The alignment layer 160 covers the counter electrode 150. For example, forming a transparent layer of resin such as polyimide on the counter electrode 150 and subjecting the transparent resin layer to an alignment process such as rubbing process can obtain the alignment layer 160. The alignment layer 160 may be formed using a photo-alignment technique.

The array substrate 20 includes a substrate 210 facing the alignment layer 160. The substrate 210 is a light-transmitting substrate such as glass plate or resin plate.

On the surface of the substrate 210 facing the alignment layer 160, pixel circuits (not shown), scanning lines (not shown), signal lines (not shown), and pixel electrodes 250 are arranged. The pixel circuits each includes a switching device such as thin-film transistor and are arranged in a matrix on the substrate. The scanning lines are arranged correspondingly with the rows of the pixel circuits. The operation of each pixel circuit is controlled by a scanning signal supplied via the scanning line. The signal lines are arranged correspondingly with the columns of the pixel circuits. Each pixel electrode 250 is connected to the signal line via the pixel circuit. Each pixel electrode 250 faces one of the coloring layers 120a to 120c.

The pixel electrodes 250 are covered with an alignment layer 260. For example, forming a transparent layer of resin such as polyimide on the pixel electrode 250 and subjecting the transparent resin layer to an alignment process such as rubbing process can obtain the alignment layer 260. The alignment layer 260 may be formed using a photo-alignment technique.

The color filter substrate 10' and the array substrate are bonded together via a frame-shaped adhesive layer (not shown). The color filter substrate 10', the array substrate 20 and the adhesive layer form a hollow structure.

The liquid crystal layer 30 is made of a liquid crystal compound or a liquid crystal composition. The liquid crystal compound or the liquid crystal composition has flowability and fills the space enclosed with the color filter substrate 10', the array substrate 20 and the adhesive layer. The color filer substrate 10', the array substrate 20, the adhesive layer and the liquid crystal layer 30 form a liquid crystal cell.

The polarizing plates 40 are adhered to the main surfaces of the liquid crystal cell. The polarizing plates 40 are arranged, for example, such that their transmission axes intersect orthogonally.

In the liquid crystal display, the regions 130a to 130c of the solidified liquid crystal layer 130 are almost equal in thickness to one another and are different in refractive index anisotropy from one another. Accordingly, it is possible to optimize the refractive index anisotropy of each of the regions 130a to 130c so as to achieve an ideal optical compensation for each of red, green and blue colors.

In addition, unavoidable variations in manufacturing conditions have a minimum effect on the surface profile of the solidified liquid crystal layer 130. Therefore, it is impossible that the unavoidable variations in the manufacturing conditions change the cell gap.

As described above, the retardation substrate 10 can be used in a transmissive liquid crystal display employing an active matrix driving method. The retardation substrate 10 can be used in other displays.

For example, the retardation substrate 10 may be used in a semi-transparent liquid crystal display or a reflective liquid crystal display. Also, driving methods other than an active matrix driving method such as passive matrix driving method may be employed in the liquid crystal display. Alternatively, the retardation substrate 10 may be used in displays other than liquid crystal displays such as organic electroluminescent display.

Examples of the present invention will be described below.

<Manufacture of Samples 1 to 17>

In the present examples, retardation substrates were manufactured by the following methods. Note that all the operations handling photosensitive materials were performed under the illumination of a yellow or red lamp in order to prevent any undesirable light exposure.

First, the materials shown below were mixed together to prepare a homogeneous mixture. The mixture was filtrated to obtain a coating solution A. For the filtration, used was a filter capable of separating particles having a diameter of 0.6 μm or larger from liquid phase.

| | |
|---|---:|
| Horizontally oriented polymerizable liquid crystal ("PALIOCOLOR LC 242" manufactured by BASF Japan Corp.) | 19.5 parts by mass |
| Photo-polymerization initiator ("Irgacure OXE01" manufactured by Ciba Specialty Chemicals Inc.) | 0.5 parts by mass |
| Surfactant ("BYK 330" manufactured by BYK-CHEMIE GmbH as a cyclohexanone-solution with a concentration of 2%) | 1.1 parts by mass |
| Cyclohexanone | 70.4 parts by mass |
| 2-acetoxy-1-methoxypropane | 8.5 parts by mass |

Then, the materials shown below were mixed together to prepare a homogeneous mixture. The mixture was filtrated to obtain a coating solution B. For the filtration, used was a filter capable of separating particles having a diameter of 0.6 μm or larger from liquid phase.

| | |
|---|---:|
| Vertically oriented polymerizable liquid crystal ("UCL-018" manufactured by Dainippon Ink and Chemicals, Inc.) | 27.6 parts by mass |
| Photo-polymerization initiator ("Irgacure 907" manufactured by Ciba Specialty Chemicals Inc.) | 1.4 parts by mass |
| Surfactant ("BYK 330" manufactured by BYK-CHEMIE GmbH as a cyclohexanone-solution with a concentration of 2%) | 0.5 parts by mass |
| Cyclohexanone | 69.4 parts by mass |
| 2-acetoxy-1-methoxypropane | 1.1 parts by mass |

Next, film formation processes using the coating solutions A and B were performed. Specifically, the coating solution A was applied to substrates using a spin coater at a dried thickness of 1.6 μm. Then, the coating solution B was applied to other substrates using a spin coater at a dried thickness of 2.4 μm. The substrates used were optically isotropic glass substrates. Subsequently, the coated films were heated at 90° C. for 20 minutes using a hot plate to dry the films. Liquid crystal material layers were thus formed on the substrates.

Then, exposure processes were performed. Specifically, first to third regions of each liquid crystal material layer were irradiated with an ultraviolet ray through a photomask. An extra-high-pressure mercury-vapor lamp was used as a source of the ultraviolet ray. During the exposure process, a deviation of temperature at each position of the substrate from an average temperature of the substrate was maintained within 3° C. and a variation in the average temperature with time was also maintained within 3° C.

Then, developing process and fixing process were performed in this order. Specifically, each liquid crystal material layer was subjected to a first heat treatment. Then, the liquid crystal material layer was subjected to a second heat treatment. During the second heat treatment, deviation of temperature at each position of the substrate from an average temperature of the substrate was maintained within 10° C.

As above, obtained were retardation substrates each having a solidified liquid crystal layer formed on the glass substrate. The conditions for manufacturing the retardation substrates were summarized in the Tables 1 and 2 below.

TABLE 1

| | | Exposure process | | | | Developing process | | | Fixing process | | |
|---|---|---|---|---|---|---|---|---|---|---|---|
| | | Exposure conditions | | | | | Oxygen | | | Oxygen | |
| Sample | Material | 1st region | 2nd region | 3rd region | Average temp. | Atmosphere | partial pressure | Substrate temp. | Atmosphere | partial pressure | Substrate temp. |
| 1 | A | 150 mJ | 20 mJ | 5 mJ | 23° C. | Nitrogen | 0.01% | 23° C.→220° C. | Nitrogen | 0.01% | 220° C. |
| 2 | ↑ | ↑ | ↑ | ↑ | ↑ | ↑ | 0.1% | ↑ | ↑ | 0.1% | ↑ |
| 3 | ↑ | ↑ | ↑ | ↑ | ↑ | ↑ | 1% | ↑ | ↑ | 1% | ↑ |
| 4 | ↑ | ↑ | ↑ | ↑ | ↑ | ↑ | 5% | ↑ | ↑ | 5% | ↑ |
| 5 | ↑ | ↑ | ↑ | ↑ | ↑ | Air atmosphere | 20% | ↑ | Air atmosphere | 20% | ↑ |
| 6 | ↑ | ↑ | 150 mJ (*1) | 150 mJ (*2) | ↑ | Nitrogen | 1% | ↑ | Nitrogen | 1% | ↑ |
| 7 | ↑ | ↑ | 20 mJ | 5 mJ | ↑ | ↑ | ↑ | 23° C.→200° C. | ↑ | ↑ | 200° C. |
| 8 | ↑ | ↑ | ↑ | ↑ | ↑ | ↑ | ↑ | 23° C.→240° C. | ↑ | ↑ | 240° C. |
| 9 | ↑ | ↑ | ↑ | ↑ | 35° C. | ↑ | ↑ | 23° C.→220° C. | ↑ | ↑ | 220° C. |
| 10 | ↑ | ↑ | ↑ | ↑ | 60° C. | ↑ | ↑ | ↑ | ↑ | ↑ | ↑ |
| 11 | ↑ | ↑ | ↑ | ↑ | 23° C. | Vacuum | 20%→1% | 120° C. | Vacuum | 1%→0.01% | ↑ |
| 12 | ↑ | ↑ | ↑ | ↑ | ↑ | ↑ | <0.01% | ↑ | ↑ | <0.01% | ↑ |

Notes:
(*1) Used was a filter having an Al layer with a thickness of 40 Å formed on a transparent substrate.
(*2) Used was a filter having an Al layer with a thickness of 60 Å formed on a transparent substrate.

TABLE 2

| | | Exposure process | | | | Developing process | | | Fixing process | | |
|---|---|---|---|---|---|---|---|---|---|---|---|
| | | Exposure conditions | | | | | Oxygen | | | Oxygen | |
| Sample | Material | 1st region | 2nd region | 3rd region | Average temp. | Atmosphere | partial pressure | Substrate temp. | Atmosphere | partial pressure | Substrate temp. |
| 13 | B | 150 mJ | 120 mJ (*3) | 180 mJ (*3) | 23° C. | Nitrogen | 0.01% | 23° C.→ 220° C. | Nitrogen | 0.01% | 220° C. |
| 14 | ↑ | ↑ | ↑ | ↑ | ↑ | ↑ | 0.1% | ↑ | ↑ | 0.1% | ↑ |
| 15 | ↑ | ↑ | ↑ | ↑ | ↑ | ↑ | 1% | ↑ | ↑ | 1% | ↑ |
| 16 | ↑ | ↑ | ↑ | ↑ | ↑ | ↑ | 5% | ↑ | ↑ | 5% | ↑ |
| 17 | ↑ | ↑ | ↑ | ↑ | ↑ | Air atmosphere | 20% | ↑ | Air atmosphere | 20% | ↑ |

Note:
(*3) A shortwave cut-off filter (325 nm) was used.

In Tables 1 and 2, the values given in the column "Exposure conditions" were exposure values with the assumption that no filter existed, while "Average temp." indicates a time average of the temperature of the substrate. Further, the symbol "↑" in each box represents that the matter to be given in this box is the same as the matter given a box that lies directly above the aforementioned box.

<Performance Evaluations>

For each solidified liquid crystal layer of the retardation substrates manufactured by the above-described methods, the degrees of depolarization of the first to third regions were determined by the following method.

First, a pair of polarizing plates were arranged to face each other such that their transmission axes were parallel with each other, and one of the polarizing plates was illuminated with a white light in a normal direction. Under this first illumination condition, measured was the luminance L1 of the transmitted light that the other polarizing plate emitted in the normal direction. Next, under the second illumination condition that is the same as the first illumination condition except for arranging the polarizing plates to face each other such that their transmission axes crossed perpendicularly, measured was the luminance L2 of the transmitted light that the above-described "the other polarizing plate" emitted in the normal direction. A ratio L1/L2 of the luminance L1 to the luminance L2 was calculated as a contrast ratio $CR_{PL}$.

On the other hand, under the third illumination condition that is the same as the first illumination condition except for placing the retardation substrate between the polarizing plates, measured was a luminance L3 of the transmitted light that the above-described "the other polarizing plate" emitted in the normal direction. Then, under the fourth illumination condition that is the same as the third illumination condition except for arranging the polarizing plates to face each other such that their transmission axes crossed perpendicularly, measured was the luminance L4 of the transmitted light that the above-described "the other polarizing plate" emitted in the normal direction. It should be noted that since the solidified liquid crystal layer had a slow axis parallel with the main surface thereof, each value of luminance L3 and L4 changed according the angles formed by the slow axis of the solidified liquid crystal layer and the transmission axes of the polarizing plates. Here, the maximum value of the ratio L3/L4 of the luminance L3 to the luminance L4 was referred to as a contrast ratio $CR_{RE}$. In short, the maximum value of the luminance L3 and the minimum value of the luminance L4 were obtained, and then the contrast ratio $CR_{RE}$ was calculated using these values.

By substituting the contrast ratios $CR_{PL}$ and $CR_{RE}$ thus obtained into the above equation, the degree of depolarization D was obtained.

There was a possibility that the value obtained here was not in perfect agreement with the degree of depolarization for each region of the solidified liquid crystal layer because not only the solidified liquid crystal layer but also the glass substrate was interposed between the polarizing plates. However, since the degree of depolarization D obtained in the case where only the glass substrate was interposed between the polarizing plates was negligible, the value obtained by the above method was considered as the degree of depolarization for each region of the solidified liquid crystal layer.

For each of the retardation substrates manufactured by the above-described methods, the heat stability of the solidified liquid crystal layer was determined by the following method. That is, the retardations of the first to third regions were determined first on the retardation substrate just after the manufacture thereof. Then, the retardation substrate was heated in the atmosphere at 230° C. for 1 hour. After this heat treatment, the retardations of the first to third regions were determined again.

The results of the tests and other optical properties of the first to third regions are summarized in the Tables 3 and 4 below. It should be noted that "Haze" is a value obtained according to Japanese Industrial Standard JIS K7136: 2000 "Plastics-Determination of haze for transparent materials".

TABLE 3

| | | Degree of depolarization | | | Retardation (nm) | | | Change in retardation | | |
|---|---|---|---|---|---|---|---|---|---|---|
| Sample | Haze | 1st region | 2nd region | 3rd region | 1st region | 2nd region | 3rd region | 1st region | 2nd region | 3rd region |
| 1 | >5% | — | — | — | 161 | 136 | 118 | 1% | <1% | <1% |
| 2 | 0.7% | $4.5 \times 10^{-4}$ | $3.8 \times 10^{-4}$ | $3.3 \times 10^{-4}$ | 161 | 139 | 116 | 1% | 1% | 1% |
| 3 | 0.6% | $4.5 \times 10^{-4}$ | $3.9 \times 10^{-4}$ | $3.3 \times 10^{-4}$ | 160 | 134 | 116 | 2% | 1% | 1% |
| 4 | 1.2% | $4.8 \times 10^{-4}$ | $4.1 \times 10^{-4}$ | $3.6 \times 10^{-4}$ | 155 | 133 | 113 | 2% | 2% | 1% |

TABLE 3-continued

|  |  | Degree of depolarization | | | Retardation (nm) | | | Change in retardation | | |
| --- | --- | --- | --- | --- | --- | --- | --- | --- | --- | --- |
| Sample | Haze | 1st region | 2nd region | 3rd region | 1st region | 2nd region | 3rd region | 1st region | 2nd region | 3rd region |
| 5 | 2.5% | $3.9 \times 10^{-4}$ | $2.7 \times 10^{-4}$ | $2.4 \times 10^{-4}$ | 141 | 122 | 106 | 6% | 4% | 3% |
| 6 | 0.7% | $4.5 \times 10^{-4}$ | $3.9 \times 10^{-4}$ | $3.5 \times 10^{-4}$ | 159 | 129 | 113 | 2% | 1% | 1% |
| 7 | >5% | — | — | — | 162 | 140 | 120 | 7% | 5% | 4% |
| 8 | 0.5% | $4.1 \times 10^{-4}$ | $3.4 \times 10^{-4}$ | $3.1 \times 10^{-4}$ | 139 | 121 | 109 | 1% | 1% | <1% |
| 9 | 1.1% | $5.7 \times 10^{-4}$ | $4.9 \times 10^{-4}$ | $4.6 \times 10^{-4}$ | 159 | 134 | 114 | 2% | 1% | 1% |
| 10 | 3.0% | $9.6 \times 10^{-4}$ | $8.1 \times 10^{-4}$ | $7.6 \times 10^{-4}$ | 140 | 119 | 101 | 1% | 1% | 1% |
| 11 | 0.3% | $4.0 \times 10^{-4}$ | $3.3 \times 10^{-4}$ | $3.0 \times 10^{-4}$ | 153 | 131 | 113 | 2% | 2% | 1% |
| 12 | >5% | — | — | — | 162 | 137 | 116 | <1% | <1% | <1% |

TABLE 4

|  |  | Degree of depolarization | | | Retardation (nm) | | | Change in retardation | | |
| --- | --- | --- | --- | --- | --- | --- | --- | --- | --- | --- |
| Sample | Haze | 1st region | 2nd region | 3rd region | 1st region | 2nd region | 3rd region | 1st region | 2nd region | 3rd region |
| 13 | >5% | — | — | — | −274 | −222 | −191 | 1% | 1% | 1% |
| 14 | 1.1% | $8.9 \times 10^{-4}$ | $4.8 \times 10^{-4}$ | $3.3 \times 10^{-4}$ | −272 | −213 | −189 | 2% | 2% | 1% |
| 15 | 1.1% | $8.9 \times 10^{-4}$ | $4.1 \times 10^{-4}$ | $3.3 \times 10^{-4}$ | −269 | −215 | −186 | 2% | 2% | 1% |
| 16 | 1.3% | $1.0 \times 10^{-4}$ | $5.7 \times 10^{-4}$ | $4.9 \times 10^{-4}$ | −265 | −206 | −183 | 2% | 2% | 2% |
| 17 | 3.5% | $2.1 \times 10^{-4}$ | $1.7 \times 10^{-4}$ | $1.5 \times 10^{-4}$ | −235 | −189 | −165 | 11% | 8% | 7% |

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A retardation substrate comprising a substrate and a solidified liquid crystal layer facing its main surface, the solidified liquid crystal layer including first to third regions arranged parallel with the main surface, wherein a degree of depolarization calculated by the equation below is less than $5 \times 10^{-4}$ for each of the first to third regions and a difference between the maximum and minimum values of the degrees of depolarization obtained for the first to third regions is less than $2.0 \times 10^{-4}$ when supposing that:

under a first illumination condition in which a pair of polarizing plates face each other such that their transmission axes are parallel with each other and one of the polarizing plates is illuminated with a white light in a normal direction, the other polarizing plate emits a transmitted light in the normal direction at a luminance L1;

under a second illumination condition which is the same as the first illumination condition except that said pair of polarizing plates face each other such that their transmission axes are orthogonal to each other, said other polarizing plate emits a transmitted light in the normal direction at a luminance L2;

a contrast ratio $CR_{PL}$ is a ratio L1/L2 of the luminance L1 with respect to the luminance L2;

under a third illumination condition which is the same as the first illumination condition except that the solidified liquid crystal layer is interposed between the pair of the polarizing plates, said other polarizing plate emits a transmitted light at a luminance L3 in the normal direction;

under a fourth illumination condition which is the same as the third illumination condition except that said pair of polarizing plates face each other such that their transmission axes are orthogonal to each other, said other polarizing plate emits a transmitted light at a luminance L4 in the normal direction; and a contrast ratio $CR_{RE}$ is a maximum value of a ratio L3/L4 of the luminance L3 with respect to the luminance L4

$$D = 1 - \frac{(CR_{PL}+1)}{(CR_{PL}-1)} \times \frac{(CR_{RE}-1)}{(CR_{RE}+1)}.$$

2. The retardation substrate according to claim 1, wherein when each of the first to third regions is subjected to heating in the atmosphere at 230° C. for 1 hour, a change in retardation thereof due to the heating is less than 5 nm or less than 3%.

3. The retardation substrate according to claim 1, wherein a haze of each of the first to third regions is less than 2%.

4. The retardation substrate according to claim 1, wherein the solidified liquid crystal layer is a continuous film.

5. The retardation substrate according to claim 1, wherein the solidified liquid crystal layer is obtained by polymerizing and/or crosslinking a thermotropic liquid crystal compound or composition.

6. The retardation substrate according to claim 1, wherein the solidified liquid crystal layer has a uniform thickness.

7. The retardation substrate according to claim 1, further comprising a color filter layer including first to third coloring regions which respectively face the first to third regions and have different absorption spectra.

8. A liquid crystal display comprising the retardation substrate according to claim 1, and a liquid crystal layer facing it.

9. A method of manufacturing a retardation substrate, comprising forming a solidified liquid crystal layer above a substrate, the formation of the solidified liquid crystal layer including:

a film formation process in which a liquid crystal material layer is formed above the substrate, the liquid crystal material layer including a photo-polymerizing or photo-crosslinking thermotropic liquid crystal compound and mesogens of the thermotropic liquid crystal compound forming a predetermined orientation structure;

an exposure process in which at least three regions of the liquid crystal material layer are exposed to light at different exposure values or at different degrees of luminous intensity or to lights of different emission lines while maintaining a deviation of temperature at each position of the substrate from an average temperature of the substrate within 3° C. and maintaining a variation in the average temperature with time within 3° C. so as to form first to third regions in the liquid crystal material layer, the first region including a polymerization or crosslinking product of the thermotropic liquid crystal compound, the second region including the polymerization or crosslinking product and the thermotropic liquid crystal compound as an unreacted compound and having a percentage of the polymerization or crosslinking product content lower than that of the first region, and the third region having a percentage of the polymerization or crosslinking product content lower than that of the second region;

a developing process subsequent thereto in which the liquid crystal material layer is heated in an atmosphere containing oxygen at a concentration which corresponds to 0.1% by volume or higher at atmospheric pressure to a temperature equal to or higher than a phase transition temperature at which the thermotropic liquid crystal compound changes from a liquid crystal phase to an isotropic phase so as to lower degree of orientation of mesogens in at least the second and third regions; and a fixing process in which the unreacted compound is polymerized and/or crosslinked in an oxygen-free atmosphere or in an atmosphere containing oxygen at a concentration which corresponds to 5% by volume or lower at atmospheric pressure while the degree of orientation kept lowered.

10. The manufacturing method according to claim 9, wherein the average temperature of the substrate is maintained 30° C. or lower in the exposure process.

11. The manufacturing method according to claim 9, wherein the exposure process is carried out in an atmosphere containing oxygen at a concentration which corresponds to 0.1% by volume or higher at atmospheric pressure.

12. The manufacturing method according to claim 9, wherein the exposure process is carried out in the air atmosphere.

13. The manufacturing method according to claim 9, wherein the exposure values for the first to third regions in the exposure process are 75% or less of an exposure value E, the exposure value E being a minimum exposure value for the first region which allows the first region to have a birefringence equal to or higher than 97% of a birefringence $\Delta n$, the birefringence $\Delta n$ is a birefringence of the first region achieved when a maximum exposure value in the exposure process is set at 1,000 mJ/cm$^2$.

14. The manufacturing method according to claim 9, wherein the liquid crystal material layer is formed in the film formation process as a continuous film having a uniform thickness.

15. The manufacturing method according to claim 9, the polymerization and/or crosslinking of the unreacted compound in the fixing process is induced by light irradiation.

16. The manufacturing method according to claim 15, wherein the light irradiation in the fixing process is performed by entirely exposing the liquid crystal material layer to light.

17. The manufacturing method according to claim 9, wherein the thermotropic liquid crystal material is a material that causes polymerization and/or crosslinking by heating a polymerization and/or crosslinking temperature higher than the phase transition temperature, and the polymerization and/or crosslinking of the unreacted compound in the fixing process is performed by heating to a temperature equal to or higher than a temperature at which the thermotropic liquid crystal compound causes polymerization and/or crosslinking.

18. The manufacturing method according to claim 17, wherein the heating in the fixing process is performed by continuously raising the temperature of the substrate from the temperature in the exposure process to the temperature in the fixing process.

19. The manufacturing method according to claim 17, wherein the deviation of temperature at each position of the substrate from an average temperature of the substrate is maintained within 3° C. during the heating in the fixing process.

20. The manufacturing method according to claim 9, further comprising forming a color filter layer above the substrate before forming the solidified liquid crystal layer, wherein the solidified liquid crystal layer is formed directly on the color filter layer or formed on the color filter layer with another layer interposed therebetween.

21. The manufacturing method according to claim 9, further comprising forming a color filter layer after forming the solidified liquid crystal layer, wherein the solidified liquid crystal layer is formed directly on the color filter layer or formed on the color filter layer with another layer interposed therebetween.

* * * * *